US010002265B2

(12) United States Patent
Shapira et al.

(10) Patent No.: US 10,002,265 B2
(45) Date of Patent: Jun. 19, 2018

(54) STORAGE SYSTEM AND METHOD FOR PROVIDING GRAY LEVELS OF READ SECURITY

(71) Applicant: SanDisk Technologies LLC, Plano, TX (US)

(72) Inventors: Ofer Shapira, Herzliya (IL); Judah Gamliel Hahn, Ofra (IL); Alexander Bazarsky, Holon (IL); Ariel Navon, Revava (IL); Danny Berler, Tel-Mond (IL)

(73) Assignee: SanDisk Technologies LLC, Plano, TX (US)

( * ) Notice: Subject to any disclaimer, the term of this patent is extended or adjusted under 35 U.S.C. 154(b) by 0 days. days.

(21) Appl. No.: 15/353,511

(22) Filed: Nov. 16, 2016

(65) Prior Publication Data
US 2018/0137309 A1 May 17, 2018

(51) Int. Cl.
H04L 9/00 (2006.01)
G06F 21/79 (2013.01)
G06F 21/62 (2013.01)
G06F 3/06 (2006.01)

(52) U.S. Cl.
CPC ............ G06F 21/79 (2013.01); G06F 3/062 (2013.01); G06F 3/0629 (2013.01); G06F 3/0652 (2013.01); G06F 3/0679 (2013.01); G06F 21/6218 (2013.01)

(58) Field of Classification Search
CPC .... G06F 21/79; G06F 21/6218; G06F 3/0679; G06F 3/0629; G06F 3/0652; G06F 3/062
See application file for complete search history.

(56) References Cited

U.S. PATENT DOCUMENTS

| 5,129,063 A * | 7/1992 | Sainola | G06F 13/124 710/1 |
|---|---|---|---|
| 7,130,977 B1 * | 10/2006 | Christie | G06F 12/1009 711/163 |
| 7,540,016 B2 | 5/2009 | Rensin et al. | |
| 9,263,138 B1 * | 2/2016 | Wilson | G11C 16/10 |
| 2005/0257049 A1 | 11/2005 | Farag | |
| 2006/0177064 A1 * | 8/2006 | Holtzman | G06F 21/77 380/277 |
| 2009/0190671 A1 * | 7/2009 | Otsuka | H04N 19/176 375/240.27 |
| 2010/0031349 A1 * | 2/2010 | Bingham | G06F 21/31 726/20 |
| 2010/0118595 A1 * | 5/2010 | Bae | G11C 5/145 365/148 |
| 2011/0246707 A1 * | 10/2011 | Ito | G06F 12/1466 711/103 |

(Continued)

Primary Examiner — Meng Li
(74) Attorney, Agent, or Firm — Brinks Gilson & Lione

(57) ABSTRACT

A storage system and method for providing gray levels of read security are provided. In one embodiment, a storage system is provided comprising a memory and a controller in communication with the memory. The controller is configured to perform a test of a security feature of the storage system; and in response to failure of the test of the security feature of the storage system, degrade a subsequent read of a set of locations in the memory. Other embodiments are possible, and each of the embodiments can be used alone or together in combination.

16 Claims, 9 Drawing Sheets

(56) References Cited

U.S. PATENT DOCUMENTS

| | | | |
|---|---|---|---|
| 2012/0131257 A1* | 5/2012 | Rudosky | G06F 15/7867 |
| | | | 711/5 |
| 2013/0142333 A1* | 6/2013 | Nagai | H04L 9/0816 |
| | | | 380/255 |
| 2013/0246728 A1* | 9/2013 | Nishiguchi | G06F 12/14 |
| | | | 711/163 |
| 2013/0339733 A1* | 12/2013 | Nagai | H04L 9/3234 |
| | | | 713/168 |
| 2016/0139808 A1* | 5/2016 | Stevens, Jr. | G06F 3/062 |
| | | | 711/163 |

* cited by examiner

STORAGE SYSTEM AND METHOD FOR PROVIDING GRAY LEVELS OF READ SECURITY

BACKGROUND

Some storage systems implement a security feature, such as requiring a correct user password before allowing access to the storage system. Some security features specify a number of incorrect attempts that are allowed before taking punitive action. For example, if an incorrect password in entered more than five times, the storage system can prevent additional attempts to enter the correct password (e.g., for some period of time or only after a subsequent power up occurs) or can even erase data on the storage system. Some storage systems allow the security feature to be enabled/disabled.

DETAILED DESCRIPTION

Figure 1A:
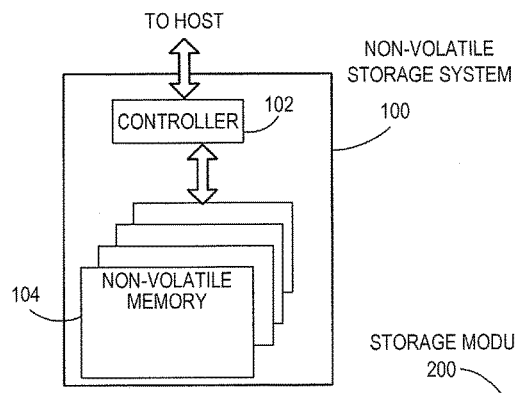
FIG. 1A is a block diagram of a non-volatile storage system of an embodiment.

By way of introduction, the below embodiments relate to a storage system and method for providing gray levels of read security. In one embodiment, a storage system is provided comprising a memory and a controller in communication with the memory. The controller is configured to perform a test of a security feature of the storage system; and in response to failure of the test of the security feature of the storage system, degrade a subsequent read of a set of locations in the memory.

In some embodiments, the set of locations is predetermined.

In some embodiments, the set of locations is selected based on a type of the test being performed.

In some embodiments, the test of the security feature of the storage system comprises one or more of the following: testing a password for validity, testing a request to determine authorization to access a memory location, testing access to diagnostic capabilities, testing access to administrative functionality in the storage system, testing write access to a read only area in the memory, testing a password change from an unauthorized user, detecting an attempt to revert with an invalid pointer to security identifier (PSID), and detecting an attempt to format the storage system without proper access credentials.

In some embodiments, an amount of degradation increases with a number of failures of the test of the security feature of the storage system.

In some embodiments, the controller is configured to degrade the subsequent read by lowering a read voltage.

In some embodiments, the controller is configured to degrade the subsequent read by re-encoding data in the set of locations in the memory with a higher rate.

In some embodiments, the controller is configured to degrade the subsequent read by increasing a read voltage to a level sufficient to cause a read disturb.

In some embodiments, the controller is configured to degrade the subsequent read by performing an erase operation instead of a read operation.

In some embodiments, the controller is configured to degrade the subsequent read by performing at least one of the following: blocking access to an address translation table and altering an address translation table to return data from an address different from an address in a read command.

In some embodiments, the memory comprises a three-dimensional memory.

In some embodiments, the storage system is embedded in a host.

In some embodiments, the storage system is removably connected to a host.

In another embodiment, a method is provided that is performed in a storage system comprising a memory. The method comprises: selecting a candidate range in the memory; tracking a number of failures of a security test; and in response to a failure of the security test, increasing a difficulty level of reading data in the candidate range, wherein the difficulty level increase with the number of failures of the security test.

In some embodiments, the candidate range is selected based on a type of security test being performed.

In some embodiments, the security test comprises one or more of the following: testing a password for validity, testing a request to determine authorization to access a memory location, testing access to diagnostic capabilities, testing access to administrative functionality in the storage system, testing write access to a read only area in the memory, testing a password change from an unauthorized user, detecting an attempt to revert with an invalid pointer to security identifier (PSID), and detecting an attempt to format the storage system without proper access credentials.

In some embodiments, the difficulty level increases by performing at least one of the following: lowering a read voltage, re-encoding data in the candidate range with a higher rate, increasing a read voltage to a level sufficient to cause a read disturb, performing an erase operation instead of a read operation, blocking access to an address translation table, and altering an address table to return data from an address different from an address in a read command.

In some embodiments, the memory comprises a three-dimensional memory.

In some embodiments, the storage system is embedded in a host.

In some embodiments, the storage system is removably connected to a host.

In another embodiment, a storage system is provided comprising a memory and means for progressively impeding a read of data in the memory in response to increased violations of a security policy of the storage system.

In some embodiments, the memory comprises a three-dimensional memory.

In some embodiments, the storage system is embedded in a host.

In some embodiments, the storage system is removably connected to a host.

Other embodiments are possible, and each of the embodiments can be used alone or together in combination. Accordingly, various embodiments will now be described with reference to the attached drawings.

Figure 1B:
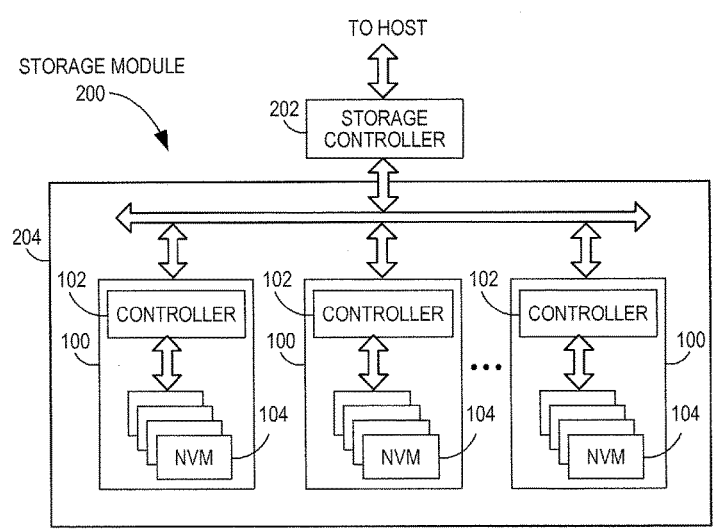
FIG. 1B is a block diagram illustrating a storage module of an embodiment.
Figure 1C:
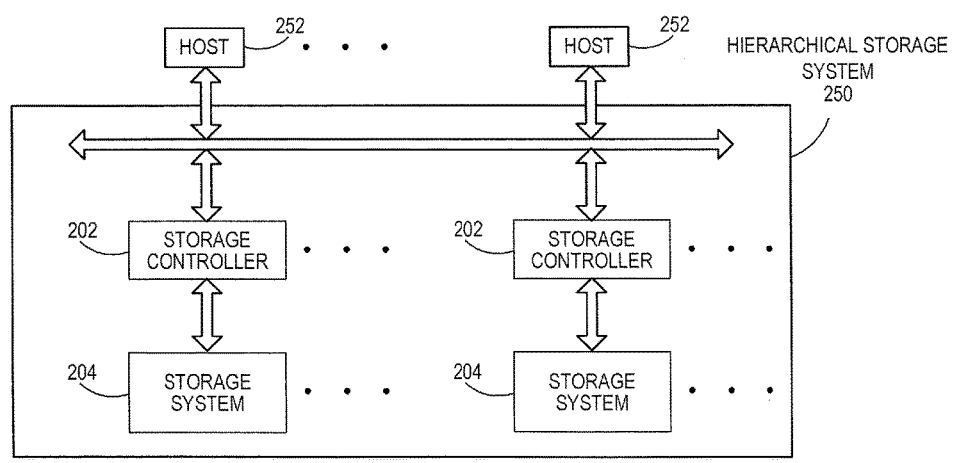
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
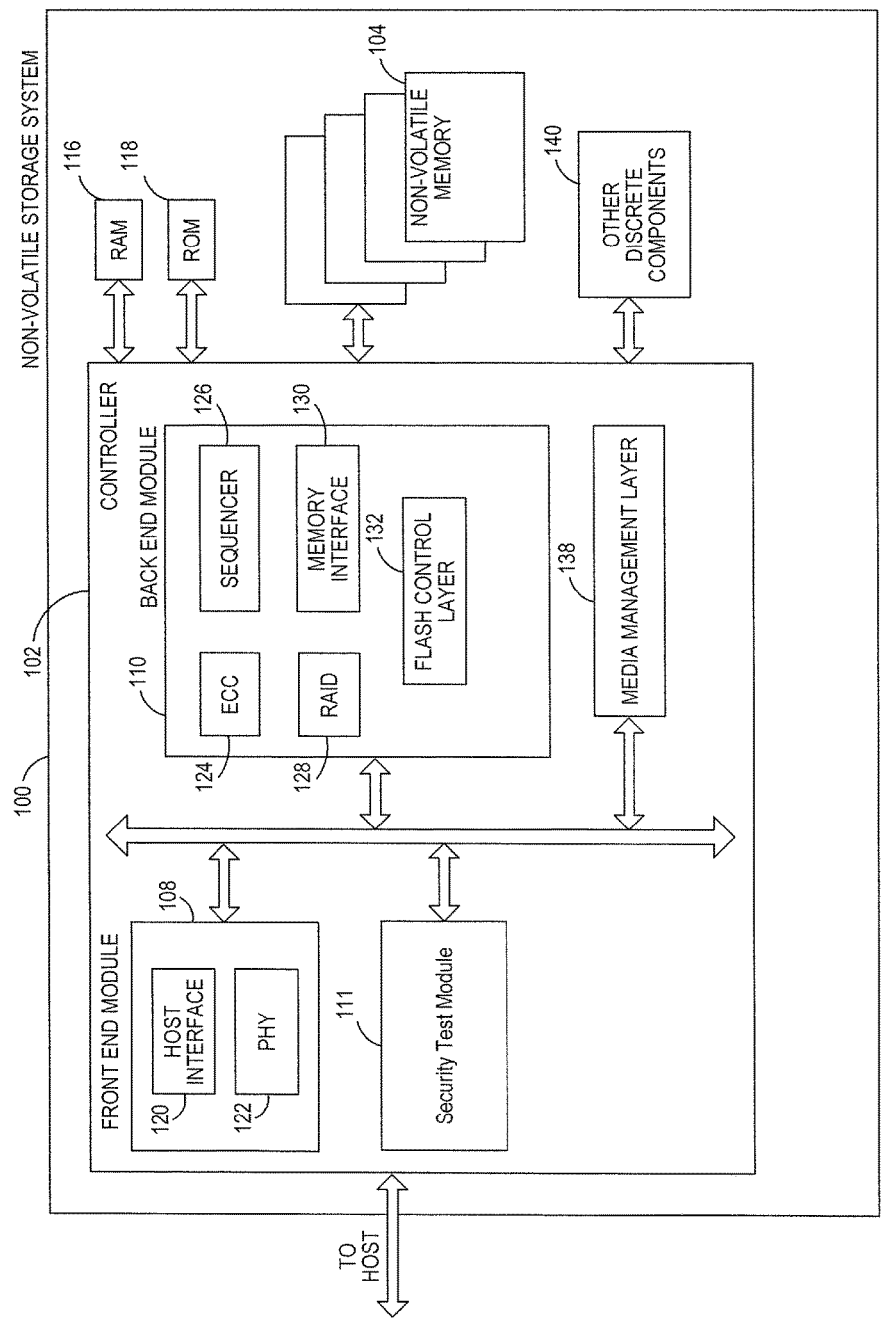
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a security test module 111, which is discussed in more detail below, and can be implemented in hardware or software/firmware.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
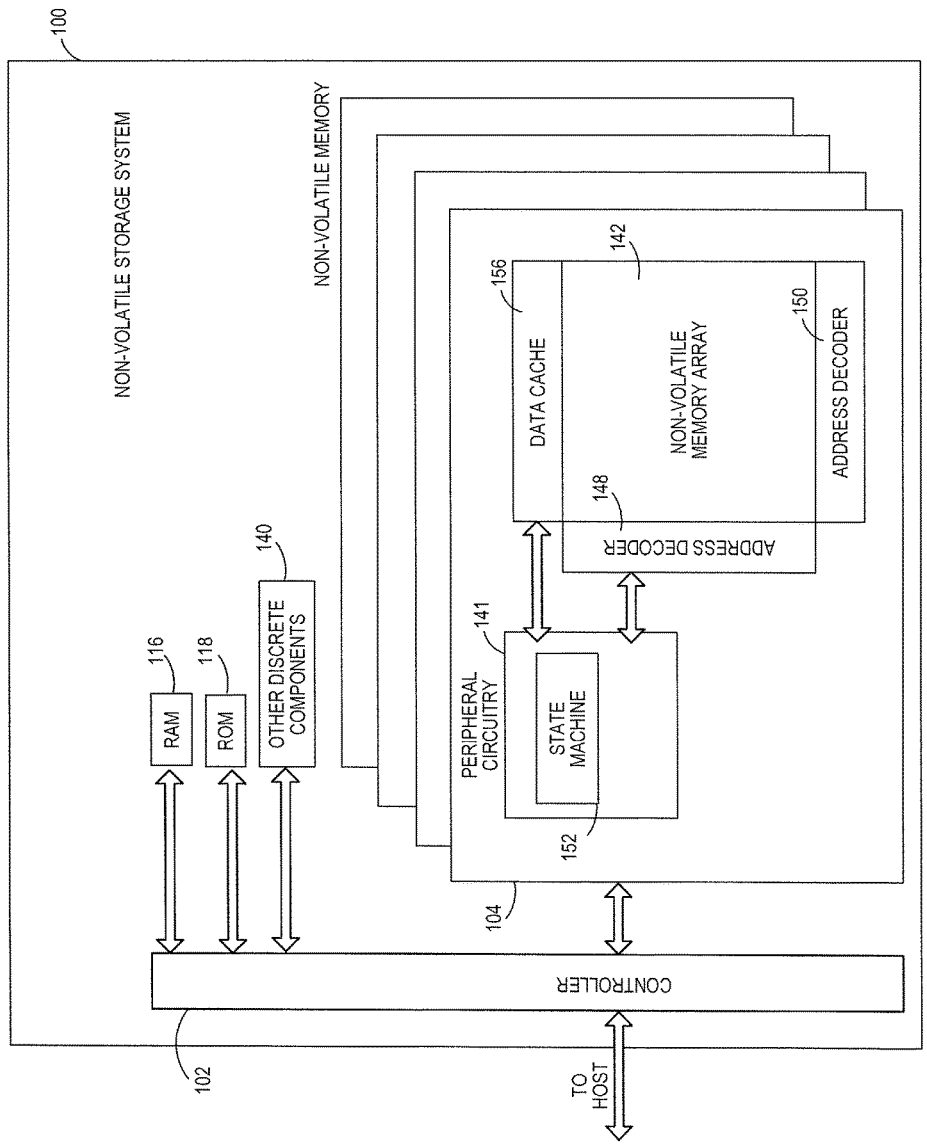
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to the controller 102. Non-volatile memory die 104 further includes a data cache 156 that caches data.

Figure 3:
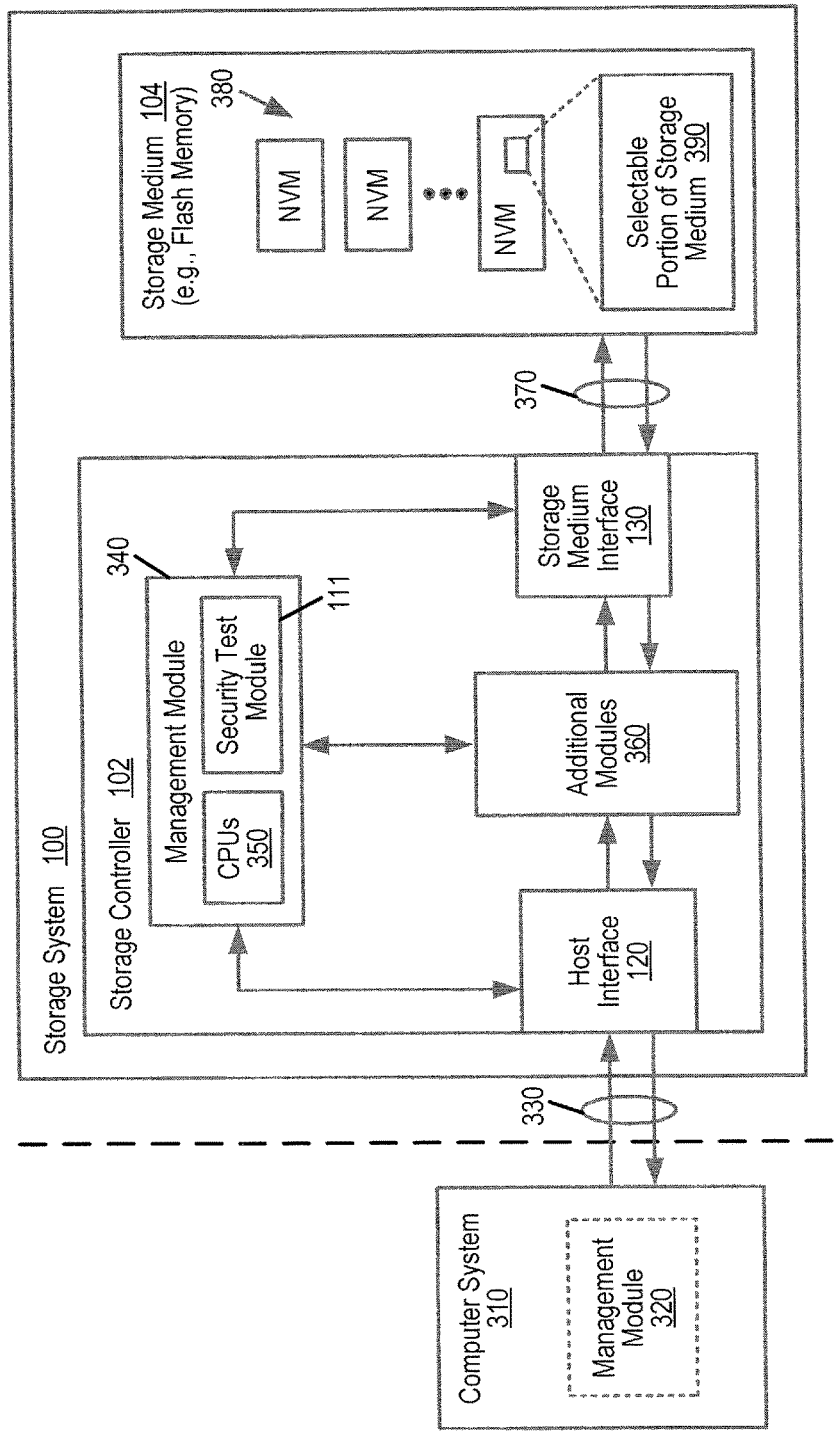
FIG. 3 is a block diagram of a computer system in communication with a storage system of an embodiment.

FIG. 3 is a block diagram of one particular implementation of a computer system 310 in communication with the storage system 100 of an embodiment. As shown in FIG. 3, the computer system 310 comprises a management module 320 configured to, among other functions, send read and/or write requests to the storage system 100 via a bus 330. The storage system 100 of this embodiment comprises a controller 102 and a memory/storage medium 104. The controller 102 comprises host and storage medium interfaces 120, 130, as discussed above, and also comprises a management module 340 and additional modules 360. The management module comprises one or more central processing units (CPUs) 350 and the security test module 111. The operation of the security test module 111 will be discussed in more detail below. In general, the security test module 111 can be implemented with hardware and/or software/firmware and can execute the algorithms presented in the flow charts discussed below. In one embodiment, the security test module 111 is implemented as an additional feature of an existing security protocol, such as, but not limited to, ATA (AT attachment) Security, TCG (Trusted Computing Group) Opal, and IEEE (Institute of Electrical and Electronic Engineers) 1667.

The controller 102 is in communication with the memory 104 via a bus 370. In this embodiment, the memory 104 comprises a plurality of non-volatile memory devices 380. FIG. 3 shows a portion 390 of one of these devices. This portion 390 is sometimes referred to herein as a set of locations in the memory or candidate range.

As mentioned above, some storage systems implement a security feature, such as requiring a correct user password before allowing access to the storage system. Some storage systems allow the security feature to be enabled/disabled. However, this means that security is defined in some storage systems as "black or white": either enabled or disabled. The following embodiments can be used to add a new security layer to the already-existing options. Specifically, these embodiments can be used to add a "gray" level (as compared to the "black or white" level previously provided) to allow more flexible usage. Examples of use cases that can benefit from "gray" level security include, but are not limited to, watchdog support scenarios (i.e., gradual degradation of data access based on proximity to an authenticating source or authority), variable access based on the reliability of the authenticated user, and gradual degradation of data access in response to authorization or authentication failure.

In general, one embodiment uses basic operations and phenomenon of flash memory to create data destruction of varying levels using reversible or irreversible methods. This provides another layer of security to storage systems, and a progressive system can be used to respond to increasing failures of a security test (e.g., the increasing number of erroneous attempt made to enter a password to unlock the storage system 100). More specifically, the security test module 111 can be configured to select a set 390 of locations in the memory 104 (e.g., a candidate range of user data or other NAND areas) and then count the number of violations of a defined security feature, policy, or test (e.g., failures of a user to enter the correct password, attempts to take a certain action in the storage system 100, etc.). Following each violation (or, alternatively, a plurality of violations), the controller 102 can disrupt the candidate range in a manner that will degrade future reads to this area, until eventually the disruption will be severe enough to possibly cause data corruption. In this way, the difficulty level of reading data in the candidate range increases with the number of failures of the security feature, policy, or test. This allows the controller 102 to impede a reading of the data in response to increased violations of a security feature, policy, or test of the storage system.

Figure 4:
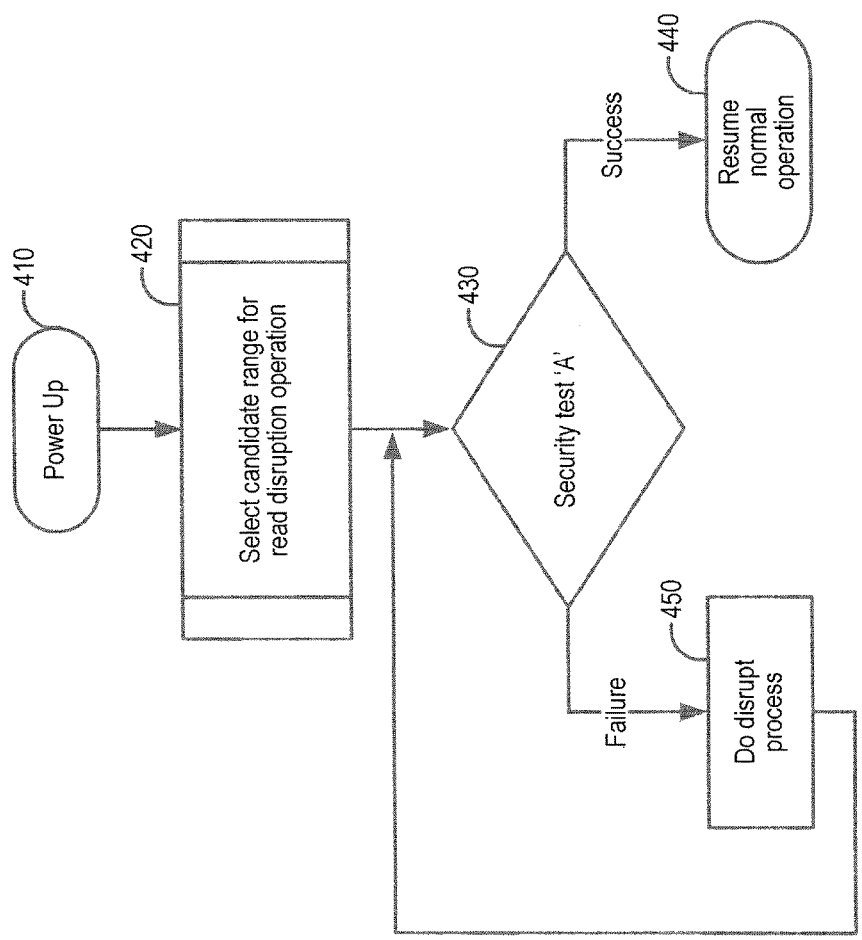
FIG. 4 is a flow chart of a method of an embodiment for providing gray levels of read security.

FIG. 4 is a flow chart of a method of an embodiment for providing gray levels of read security. As shown in FIG. 4, in one embodiment, during power-up (410), the controller 102 (e.g., using the test security module 111) selects a candidate range for a read disruption operation (420). The candidate range can be selected in advance at power up (i.e., the set of locations in the memory can be predetermined) or as a function of the security test being performed. For example, the candidate range can include key areas of user data or can include secure data, such as storage for system secrets or firmware-specific data. The candidate range can also include data related to the specific namespace (or locking range) being accessed or global data.

After the candidate range (i.e., the set of locations in memory) has been selected, the controller 102 performs a test ("Security test 'A'") of a security feature or policy of the storage system 100 (430). A security feature, policy, or test of the storage system 100 can take any suitable form. Examples include, but are not limited to, testing a password for validity, testing a request to determine authorization to access a memory location, testing access to diagnostic capabilities, testing access to administrative functionality in the storage system, testing write access to a read only area in the memory, testing a password change from unauthorized user, detecting an attempt to revert with an invalid pointer to security identifier (PSID), and detecting an attempt to format the storage system without proper access credentials.

If the test of the security feature is successful, the controller 102 resumes normal operation of the storage system 100 (440). However, if there was a failure of the test, the controller 102 can take an action to degrade a subsequent read of candidate range (450). Following the change in parameters, a read may be triggered to the candidate range in order to cause the desired disruption. As discussed above, in one embodiment, a progressive system is used, such that an amount of degradation/disruption can increase with a number of failures of the test (e.g., the controller 102 can set the read parameters according a failure count, which can be set by the user or otherwise provide an adjustable tolerance).

Examples of actions the controller 102 can take to disrupt the read operation include, but are not limited to, lowering a read voltage (e.g., to prevent current flow to a sense amplifier), re-encoding candidate ranges with a higher rate, increasing a read voltage to a level sufficient to cause a read disturb, performing an erase operation instead of a read operation, and preventing data access/returning unexpected data. FIGS. 5-8 will now be discussed to illustrate some of these examples.

Figure 5:
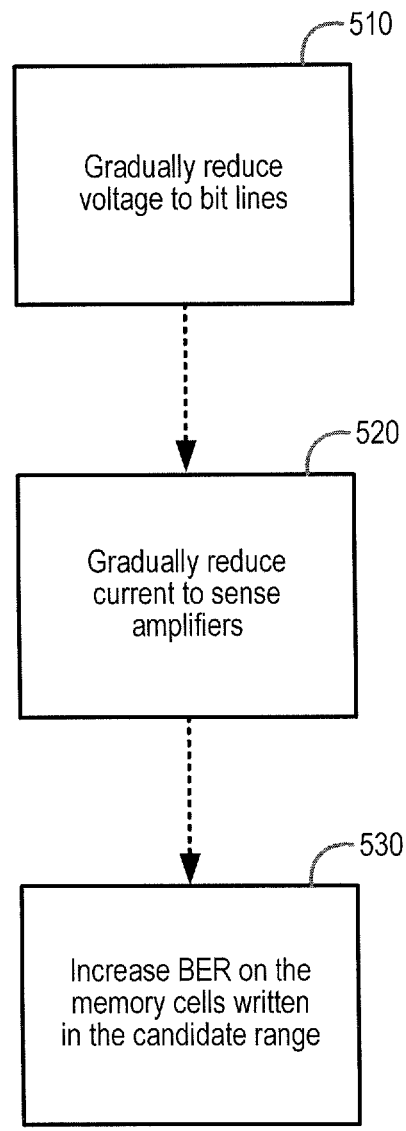
FIG. 5 is a flow chart of a method of an embodiment for degrading a subsequent read of a set of locations in memory by lowering read voltage.

FIG. 5 is a flow chart of a method of an embodiment for degrading a subsequent read of a set of locations in memory by lowering read voltage to prevent current flow to sense amplifiers (e.g., lowering the read voltage, Vread, to minimum to prevent any current flow to the sense amplifiers). The controller 102 can do this, for example, by programming a lower read voltage value into a register used by the state machine 152 in the memory 104. As shown in the flow chart in FIG. 5, in one embodiment, when reading the candidate range, the controller 102 gradually reduces voltage to the bit lines in the memory (510), which gradually reduces the current to the sense amplifiers (520). This gradually increases the bit error rate (BER) on the memory cells written in the candidate range (530). This method impedes/prevents data from being read from the candidate range without disturbing the memory; hence, this method is fully reversible.

Figure 6:
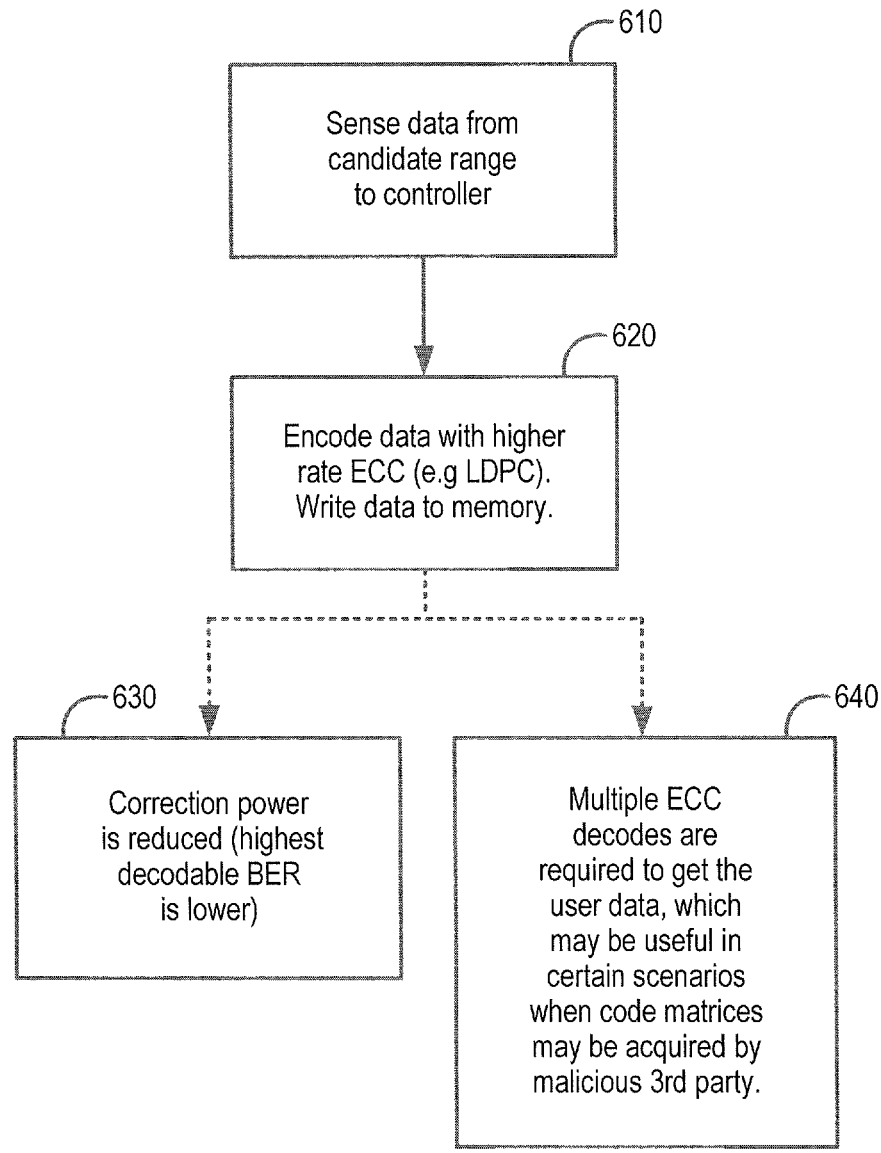
FIG. 6 is a flow chart of a method of an embodiment for degrading a subsequent read of a set of locations in memory by re-encoding candidate ranges with a higher rate.

FIG. 6 is a flow chart of a method of an embodiment for degrading a subsequent read of a set of locations in memory by re-encoding candidate ranges with a higher rate. The controller 102 can do this, for example, by changing the parameters used by the ECC module 124. As shown in FIG. 6, the controller 102 first senses data from the candidate range (610). The controller 102 then re-encodes (e.g., using the ECC module 124) the data with a higher-rate error correction code (ECC) (such as, for example, low-density parity-check (LDPC) code) and writes the data to the memory 104 (620). This action has two implications. First, the correction power of the controller 102 is reduced because decreasing the highest decodable bit error rate (BER) is similar to increasing the overall BER (630). Second, multiple ECC decoding stages would be required to get the user data (640). From a security point of view, this may be useful in certain scenarios, such as when the code matrices are acquired by a malicious third party. After re-encoding the data, the code matrices would be useless to the third party, thus complicating malicious reads.

Figure 7:
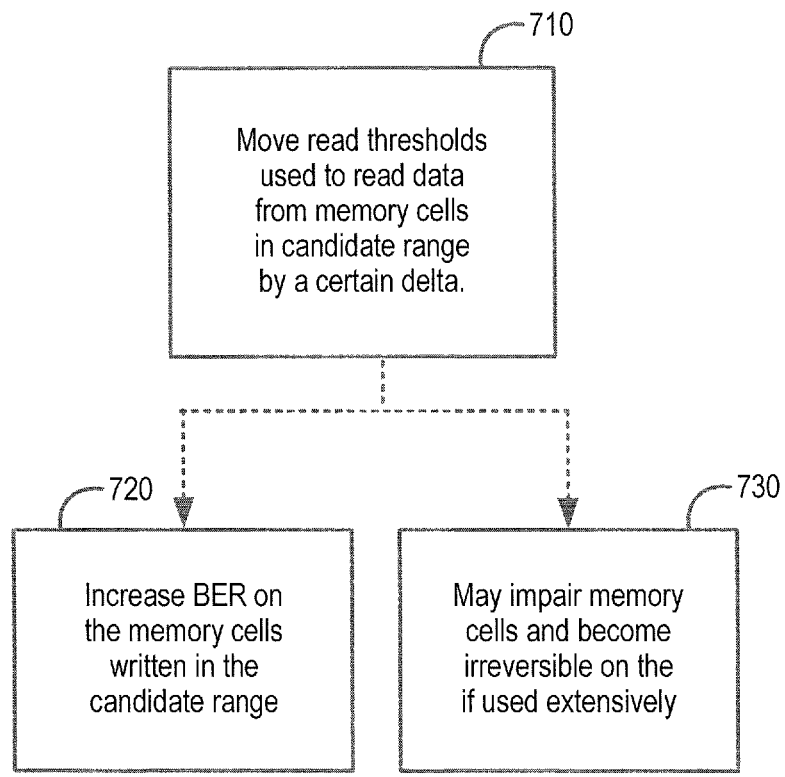
FIG. 7 is a flow chart of a method of an embodiment for degrading a subsequent read of a set of locations in memory by moving a read threshold.

FIG. 7 is a flow chart of a method of an embodiment for degrading a subsequent read of a set of locations in memory by moving a read threshold. This method increases a read voltage (Vread) to a level sufficient to cause a read disturb (e.g., replacing Vsense by Vread, and setting Vread to a high level). The controller 102 can do this, for example, by programming a different read threshold value into a register used by the state machine 152 in the memory 104. As shown in FIG. 7, the controller 102 can move thresholds used to read data from memory cells in the candidate range by a certain delta (710). Moving the voltage read threshold between different programmed states when reading from the candidate range can gradually increase the bit error rate (BER) (720). This method is generally reversible, but if used too much, may become irreversible because accumulating read disturb errors may impair the memory cells (730).

As another option, the controller 102 can prevent data access and/or return unexpected data by blocking access to the global address table (GAT) in the flash control layer 132 or media management layer 138 or altering it, so that when an attempt is made to read a certain logical block address, the logical-to-physical address translation will result in returning data corresponding to a different logical block address. In this embodiment, users can be given a special command sequence to "unlock" the secured data later (releasing the GAT blockage); hence, this GAT-based method may be reversible.

Figure 8:
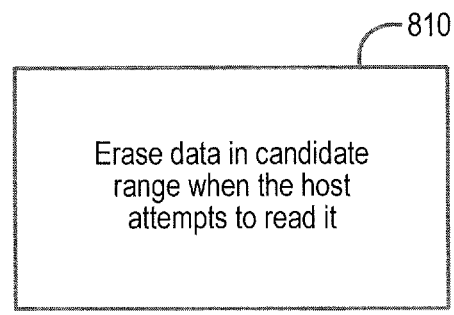
FIG. 8 is a flow chart of a method of an embodiment for degrading a subsequent read of a set of locations in memory by replacing a read operation with an erase operation.

FIG. 8 shows another option: erasing data in the candidate range when the host attempts to read it (e.g., replace a read operation from the host with an erase operation) (810). The controller 102 can do this, for example, by altering the flash control layer 132 or media management layer 138 to selectively swap read and erase operations when a certain logical block address is attempted to be read. While the above options are generally reversible, erasing data in the candidate range is not, as it destroys the data completely. This option may be desired in a "last resort" situation, where the host cannot be trusted at all, and the data needs wiping.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller in communication with the memory, wherein the controller is configured to:
perform a test of a security feature of the storage system; and
in response to failure of the test of the security feature of the storage system, degrade a subsequent read of a set of locations in the memory by using a read parameter that increases an error rate, wherein an amount of degradation increases with a number of failures of the test of the security feature of the storage system.

2. The storage system of claim 1, wherein the set of locations is predetermined.

3. The storage system of claim 1, wherein the set of locations is selected based on a type of the test being performed.

4. The storage system of claim 1, wherein the test of the security feature of the storage system comprises one or more of the following: testing a password for validity, testing a request to determine authorization to access a memory location, testing access to diagnostic capabilities, testing access to administrative functionality in the storage system, testing write access to a read only area in the memory, testing a password change from an unauthorized user, detecting an attempt to revert with an invalid pointer to security identifier (PSID), and detecting an attempt to format the storage system without proper access credentials.

5. The storage system of claim 1, wherein the controller is configured to lower a read voltage to increase the error rate.

6. The storage system of claim 1, wherein the controller is configured to re-encode data in the set of locations in the memory with a higher rate to increase the error rate.

7. The storage system of claim 1, wherein the controller is configured to increase a read voltage to a level sufficient to cause a read disturb to increase the error rate.

8. The storage system of claim 1, wherein the memory comprises a three-dimensional memory.

9. The storage system of claim 1, wherein the storage system is embedded in a host.

10. The storage system of claim 1, wherein the storage system is removably connected to a host.

11. A method comprising:
performing the following in a storage system comprising a memory:
performing a test of a security feature of the storage system; and
in response to failure of the test of the security feature of the storage system, degrading a subsequent read of a set of locations in the memory by altering data stored in the set of locations in the memory, wherein an amount of degradation increases with a number of failures of the test of the security feature of the storage system.

12. The method of claim 11, wherein the set of locations is predetermined.

13. The method of claim 11, wherein the set of locations is selected based on a type of the test being performed.

14. The method of claim 11, wherein altering data stored in the set of locations in the memory comprises performing an erase operation instead of a read operation in the set of locations in the memory.

15. The method of claim 11, wherein the memory comprises a three-dimensional memory.

16. A storage system comprising:
a memory:
means for performing a test of a security feature of the storage system; and
means for in response to failure of the test of the security feature of the storage system, degrading a subsequent read of a set of locations in the memory by performing at least one of the following: (i) blocking access to an address translation table and (ii) altering an entry in an address translation table for the set of locations in the memory, wherein an amount of degradation increases with a number of failures of the test of the security feature of the storage system.

* * * * *